Feb. 20, 1962 P. G. SIEBERT 3,022,126
BEARING AND SHROUD COMBINATION
Filed April 1, 1959
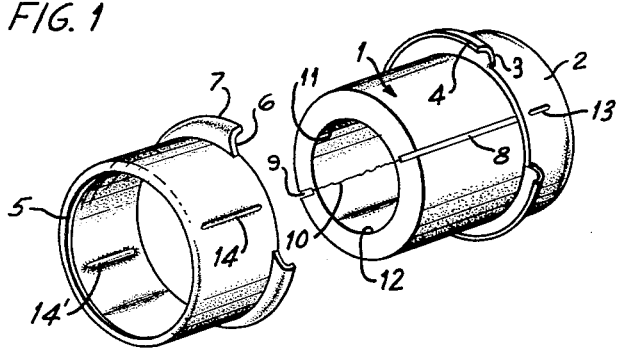
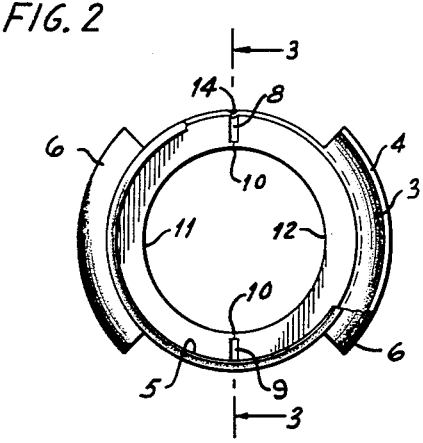
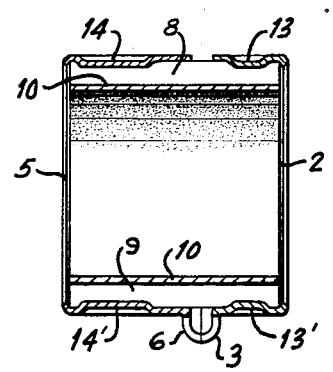
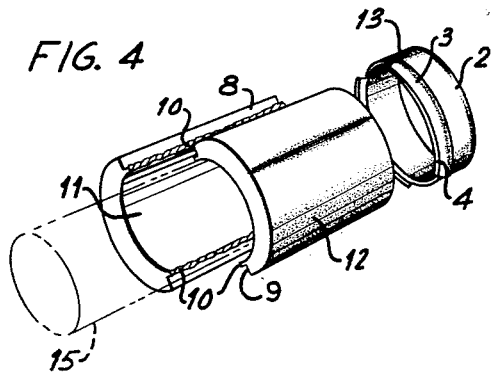
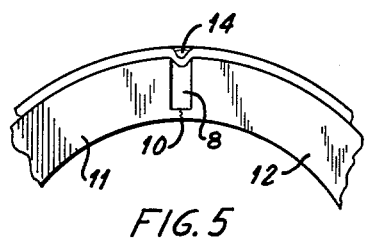
INVENTOR.
PRESTON G. SIEBERT
BY
ATTORNEYS

United States Patent Office 3,022,126
Patented Feb. 20, 1962

3,022,126
BEARING AND SHROUD COMBINATION
Preston G. Siebert, Underhill Road, Ossining, N.Y.
Filed Apr. 1, 1959, Ser. No. 803,407
5 Claims. (Cl. 308—237)

The present invention is directed to bearings, more particularly to those which are incorporated in self-alining bearing-hanger units, said bearings being usually of metallized graphite.

Such bearing-hanger units are particularly suitable for use in continuously moving belts in driers for various articles, such as plaster board and the like. In my co-pending application Serial No. 793,407, filed February 16, 1959, now Patent No. 2,943,893, there is described an improved unit of this type. These units are mounted on the frame of the drier with the shafts passing through the bearings; and usually a sprocket is mounted on the shaft on the outside of the bearing. These bearings are subject to wear and have to be replaced. In order to do so, the sprocket must be removed, the bearing with its shroud slipped over the end of the shaft, a new bearing with its shroud slipped back on and the sprocket again secured in place on the end of the shaft. This required considerable time and the use of skilled labor, and the drier was out of service for a substantial time.

This invention is an improvement on the above identified application for patent, it being among the objects thereof to provide a bearing adapted for incorporation in a self-alining bearing structure which is capable of replacement without the necessity of dismantling any elements, such as sprockets.

It is also among the objects of the invention to provide a novel construction of a bearing of the type described which is simple in its structure and inexpensive to produce, with a minimum of parts.

It is further among the objects of the invention to provide a bearing which may be quickly replaced when worn and a new bearing equally rapidly inserted without the use of highly skilled labor.

In practicing the invention there is provided a cylindrical bearing, usually of metallized graphite. It is held in a shroud consisting of two cylindrical sheet metal covers which are slipped over the opposite ends of the bearing and which act as a support for the bearing whereby it is mounted in its hanger. Diametrically opposite longitudinal grooves are formed in the outer face of the bearing, the depth of the grooves being variable but usually being at least one-half of the thickness of the bearing. The bearing is then split forming rough or jagged edges along the portions thereof, adjacent to the grooves. Each of the pieces of the shroud has longitudinal depressions thereon of a width and length and so located as to fit into the upper edges of the grooves, thus providing anchoring means between the bearing and shroud parts.

The split edges of the bearing are fitted together so that the jagged points interfit and the bearing surface on which the shaft turns is intact. The shroud elements make certain that the bearing is held together. The indentations in the shroud hold the bearing from turning within the shroud so that the anchoring in the hanger is maintained.

In the accompanying drawing constituting a part hereof and in which like reference characters indicate like parts, FIG. 1 is an exploded perspective view of a bearing made in accordance with the present invention;

FIG. 2 is an end view of the bearing;

FIG. 3 is a longitudinal cross-sectional view of the bearing taken along line 3—3 of FIG. 2;

FIG. 4 is an exploded perspective view of the bearing with part of the shroud removed to more clearly illustrate the split-apart bearing with its jagged edges, and FIG. 5 is an enlarged fragmentary end view of that part of the bearing where the groove and split are located.

Cylindrical bearing 1 has a shroud element 2 at one end thereof. The inner end of element 2 has an upstanding partial flange 3 with an in-turned edge 4. A similar shroud element 5, usually longer than element 2, is fitted onto the other end of bearing 1 and has an upstanding flange 6 with an in-turned edge 7. When fitted together on the bearing the inturned edges 4 and 7 of flange 3 and 6, respectively, meet as shown in FIG. 3. The flanges serve as means for holding the bearing in its hanger.

Diametrically opposite grooves 8 and 9 are cut into the bearing 1 along its entire length. As shown, these grooves extend through more than three-quarters of the thickness of the bearing, although they may be shallower or deeper. The bearing is then split forming jagged edges 10 and also forming two semi-cylindrical halves 11 and 12. In shroud element 2, two diametrically opposite indentations 13 and 13' are formed and of such size as to fit into grooves 8 and 9. Similarly, in shroud element 5, two diametrically opposite indentations 14 and 14' are formed.

In operation, we assume that a bearing has been installed on the shaft 15 with shroud elements and a bearing thereon, when the machine was erected. When the bearing has become worn and requires replacement, shroud elements 2 and 5 are slipped off of the bearing, the two parts 11 and 12 separated and removed. Then the two parts 11 and 12 of a new bearing are placed around shaft 15 as shown in FIG. 4 and are pressed together. Shrouds 2 and 5 are then slipped onto the ends of the bearing and forced into position as shown in FIG. 3. The whole operation is completed in a very few minutes by relatively unskilled labor.

There are usually provided a plurality of indentations on each of flanges 3 and 6, say three in number. These indentations extend outwardly towards the ends of the bearing. They fill the space between the shroud and the hanger in which the bearing is mounted, to prevent or minimize longitudinal movement of the shroud on the bushing.

What is claimed is:

1. A bearing comprising a cylindrical body having a pair of longitudinal grooves in diametrically opposite positions, said body being split in the area of said grooves, and an annular shroud surrounding and in contact with said body and holding said bearing parts together, said shroud consisting of two elements fitting over the opposite ends of said body, said shroud being removable from said body by endwise movement thereof.

2. A bearing comprising a cylindrical body having a pair of longitudinal grooves in diametrically opposite positions, said body being split in the area of said grooves, and an annular shroud surrounding and in contact with said body and holding said bearing parts together, said shroud having at least one indentation fitting into at least one of said grooves, said shroud being removable from said body by endwise movement thereof.

3. A bearing comprising a cylindrical body having a pair of longitudinal grooves in diametrically opposite positions, said body being split in the area of said grooves, and an annular shroud surrounding and in contact with said body and holding said bearing parts together, said shroud consisting of two elements fitting over the opposite ends of said body, each of the elements of said shroud having at least one indentation fitting into at least one of said grooves, said shroud being removable from said body by endwise movement thereof.

4. A bearing comprising a cylindrical body having a pair of longitudinal grooves in diametrically opposite positions, said body being split in the area of said grooves, and an annular shroud surrounding and in contact with said body and holding said bearing parts together, said shroud consisting of two elements fitting over the opposite ends of said body, both of said elements having indentations on diametrically opposite sides fitting into both of said grooves, said shroud being removable from said body by endwise movement thereof.

5. A bearing comprising a cylindrical body having a pair of longitudinal grooves in diametrically opposite positions, said body being split in the area of said grooves, and an annular shroud surrounding and in contact with said body and holding said bearing parts together, said shroud having at least one indentation fitting into at least one of said grooves, said indentation having a substantial longitudinal extent, said shroud being removable from said body by endwise movement thereof.

References Cited in the file of this patent

UNITED STATES PATENTS

| | | |
|---|---|---|
| 552,902 | George | Jan. 14, 1896 |
| 1,675,728 | Pierce | July 3, 1928 |
| 2,371,400 | Mantle | Mar. 13, 1945 |
| 2,819,932 | Walker | Jan. 14, 1958 |
| 2,897,025 | Nickerson | July 28, 1959 |

FOREIGN PATENTS

| | | |
|---|---|---|
| 934,802 | Germany | Nov. 3, 1955 |